(12) United States Patent
Ayirala et al.

(10) Patent No.: US 11,274,535 B1
(45) Date of Patent: Mar. 15, 2022

(54) SEISMIC ASSISTED FLOODING PROCESSES FOR OIL RECOVERY IN CARBONATES

(71) Applicant: SAUDI ARABIAN OIL COMPANY, Dhahran (SA)

(72) Inventors: Subhash Ayirala, Dhahran (SA); Abdulaziz S. Al-Qasim, Dhahran (SA); Ali Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/006,042

(22) Filed: Aug. 28, 2020

(51) Int. Cl.
- *E21B 43/20* (2006.01)
- *E21B 43/00* (2006.01)
- *E21B 49/00* (2006.01)
- *C09K 8/58* (2006.01)

(52) U.S. Cl.
CPC ......... *E21B 43/20* (2013.01); *C09K 8/58* (2013.01); *E21B 43/003* (2013.01); *E21B 49/00* (2013.01)

(58) Field of Classification Search
CPC ........................................... E21B 43/20
See application file for complete search history.

(56) References Cited

U.S. PATENT DOCUMENTS

| | | | | |
|---|---|---|---|---|
| 4,125,156 A * | 11/1978 | Glinsmann | ......... | C09K 8/584 166/270.1 |
| 2009/0200019 A1 * | 8/2009 | DeLaCroix | ......... | E21B 28/00 166/249 |
| 2012/0061077 A1 | 3/2012 | Fraim et al. | | |
| 2012/0175107 A1 * | 7/2012 | Kostrov | ......... | G01V 1/52 166/249 |
| 2013/0000886 A1 | 1/2013 | McGee et al. | | |
| 2014/0305877 A1 | 10/2014 | Cioanta et al. | | |
| 2014/0338895 A1 | 11/2014 | Paulsen | | |
| 2015/0039234 A1 | 2/2015 | Abou-Sayed et al. | | |
| 2015/0275628 A1 | 10/2015 | McGee et al. | | |

(Continued)

FOREIGN PATENT DOCUMENTS

| | | |
|---|---|---|
| WO | 2011/070142 A2 | 6/2011 |
| WO | 2013066552 A2 | 5/2013 |

OTHER PUBLICATIONS

Yousef, A.A., Al-Saleh, S.H., Al-Kaaibi, A. et al. 2011. Laboratory Investigation of the Impact of Injection Water Salinity and Ionic Content on Oil Recovery from Carbonate Reservoirs. SPE Reservoir Evaluation & Engineering 14 (5): 578-593 (16 pages).

(Continued)

*Primary Examiner* — William D Hutton, Jr.
*Assistant Examiner* — Avi T Skaist
(74) *Attorney, Agent, or Firm* — Osha Bergman Watanabe & Burton LLP

(57) ABSTRACT

An oil recovery method may include injecting 0.05 to 0.25 pore volumes of low-salinity water having 4,000-8,000 ppm of total dissolved solids into a reservoir, and then applying seismic stimulation to the reservoir for a predetermined duration. The steps of injecting low-salinity water and applying seismic stimulation are repeated until 0.25 to 1.0 pore volumes of the low-salinity water has been added to the reservoir. Then, high-salinity water having 35,000 to 57,000 ppm of total dissolved solids is introduced to the reservoir.

12 Claims, 3 Drawing Sheets

(56) References Cited

U.S. PATENT DOCUMENTS

2016/0160621 A1* 6/2016 Collins ................ E21B 43/20
                                                166/270.1
2017/0204323 A1* 7/2017 Ayirala ................ E21B 43/20
2019/0271202 A1   9/2019 Saltykov et al.

OTHER PUBLICATIONS

Wooden, B., 2018. Seismic Stimulation: An Eco-friendly, Effective EOR Alternative, Journal of Petroleum Technology, August, pp. 21-23 (3 pages).

Mullakaev, M.S., Abramov, V.O. and Abramova, A.V. 2015. Development of Ultrasonic Equipment and Technology for Well Stimulation and Enhanced Oil Recovery, Journal of Petroleum Science and Engineering, 125, pp. 201-208(8 pages).

Nur Syazwani et al., "Enhanced oil recovery by ultrasonic waves" 2009 (44 pages).

International Search Report and Written Opinion of the International Searching Authority issued in corresponding International Application No. PCT/US2020/052708, dated May 25, 2021 (14 pages).

Beresnev I A et al., "Elastic-Wave Stimulation of Oil Production: A Review of Methods and Results", Geophysics, Society of Exploration Geophysicists, US, vol. 59, No. 6, pp. 1000-1017, Jun. 1994 (18 pages).

* cited by examiner

SEISMIC ASSISTED FLOODING PROCESSES FOR OIL RECOVERY IN CARBONATES

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from an oil well. In enhanced oil recovery, a fluid is typically introduced through an injection well that is in fluid communication with the underground hydrocarbon reservoir in order to re-pressurize the reservoir and displace oil toward the surface. Some examples of these techniques include water flooding, chemical flooding, and supercritical $CO_2$ injections. These techniques require the use of significant amounts of water and/or other chemical constituents in order to effectively recover oil from subterranean formations. They also may suffer from inefficient oil recovery due to oil being dispersed in water phases, making separation and recovery from a well challenging.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an oil recovery method including injecting 0.05 to 0.25 pore volumes of low-salinity water having 4,000-8,000 ppm of total dissolved solids into a reservoir, and then applying seismic stimulation to the reservoir for a predetermined duration. The steps of injecting low-salinity water and applying seismic stimulation are repeated until 0.25 to 1.0 pore volumes of the low-salinity water has been added to the reservoir. Then, high-salinity water having 35,000 to 57,000 ppm of total dissolved solids is introduced to the reservoir.

In another aspect, embodiments disclosed herein relate to an oil recovery method including measuring at least one property of a reservoir and then determining a seismic stimulation duration for the reservoir based upon the reservoir property. The method also includes injecting 0.05 to 0.25 pore volumes of low-salinity water having 4,000-8,000 ppm of total dissolved solids into the reservoir and then applying seismic stimulation to the reservoir for the determined duration. The steps of injecting low-salinity water and applying seismic stimulation are repeated until 0.25 to 1.0 pore volumes of the low-salinity water has been added to the reservoir. Then, high-salinity water having 35,000 to 57,000 ppm of total dissolved solids is introduced to the reservoir.

Other aspects and advantages of the claimed subject matter will be apparent from the following description and the appended claims.

DETAILED DESCRIPTION

Embodiments disclosed herein generally relate to the enhanced oil recovery techniques that are directed to the combination of a low salinity water injection coupled with seismic stimulation. In particular, embodiments relate to alternating injection of a low salinity water and application of seismic stimulation until a threshold level of low salinity water is injected, which is followed by injection of a high salinity water.

In one aspect, embodiments disclosed herein relate to injecting 0.05 to 0.25 pore volumes of low-salinity water comprising 4,000-8,000 ppm of total dissolved solids into a reservoir, applying seismic stimulation to the reservoir for a predetermined duration, repeating the steps of injecting low-salinity water and applying seismic stimulation until 0.25 to 1.0 pore volumes of the low-salinity water has been added to the reservoir, and introducing an amount of high-salinity water comprising 35,000 to 57,000 ppm of total dissolved solids to the reservoir. Pore volume is defined as $\Pi r2\ h*\varphi$, where r is the radius (distance between the injection well to production well), h is the reservoir thickness and y is the porosity. Pore volume may also be determined from numerical simulations as well as tracer tests.

Figure 1:
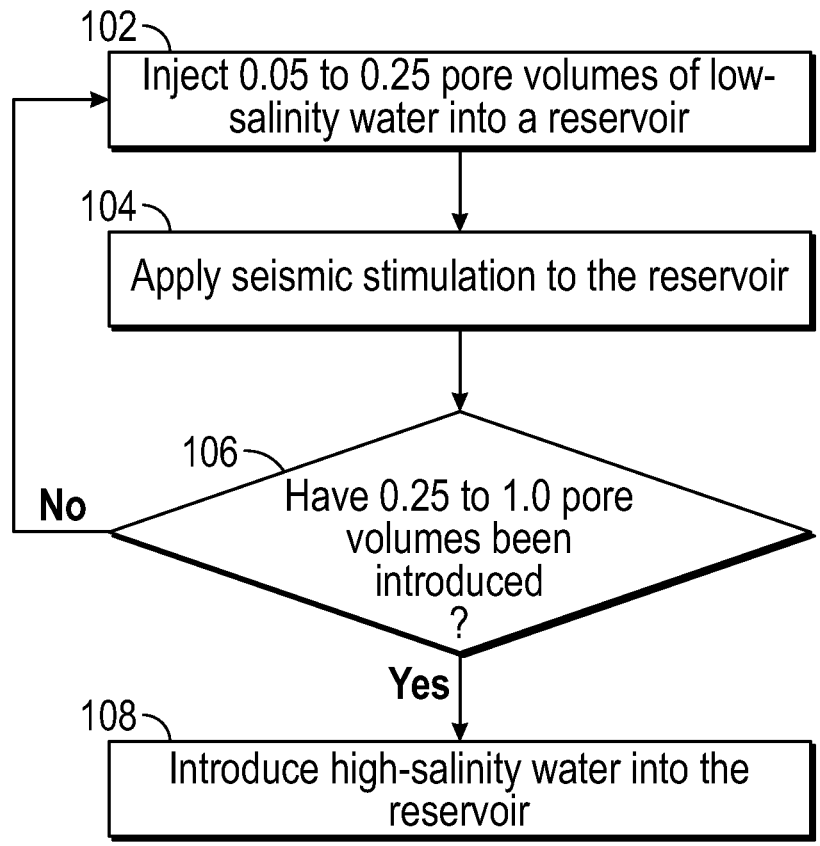
FIG. 1 is a block flow diagram of a method in accordance with one or more embodiments of the present disclosure.

An exemplary method in accordance with one or more embodiments of the present disclosure is shown in FIG. 1. First, 0.05 to 0.25 pore volumes of low-salinity water is injected into reservoir (102). Then, seismic stimulation is applied to the reservoir (104) for a predetermined duration of time. After seismic stimulation has been applied for the predetermined duration of time, low-salinity water is again injected into the reservoir (102) and seismic stimulation is again applied to the reservoir (104). These steps (102 and 104) are repeated sequentially until an amount of 0.25 to 1.0 pore volumes of low-salinity water has been added to the reservoir (106). Finally, high salinity water is introduced into the reservoir (108).

Figures 2A, 2B:
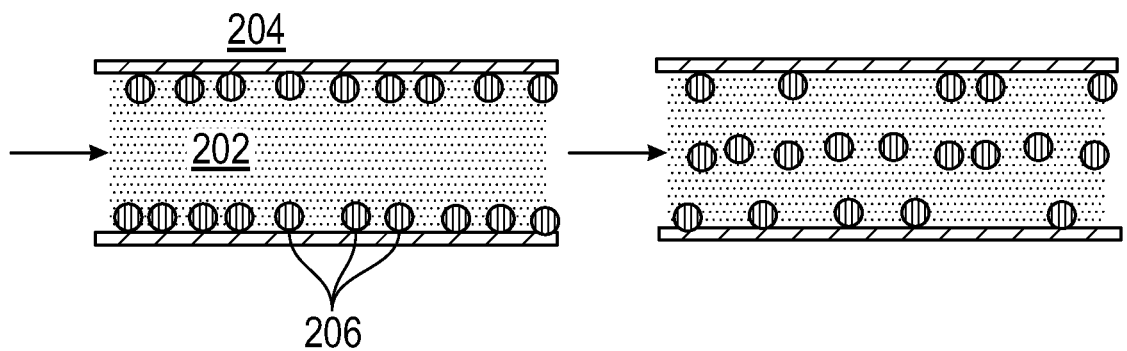
FIG. 2A is a schematic depiction of oil in a reservoir in accordance with one or more embodiments of the present disclosure.
FIG. 2B is a schematic depiction of oil in a reservoir in accordance with one or more embodiments of the present disclosure.

Referring now to FIG. 2, a schematic depiction in accordance with one or more embodiments of the present disclosure is shown. FIGS. 2A and 2B show a mechanism of the effects of low-salinity water injection. FIG. 2A shows a carbonate surface (204) with oil (206) adhered to it. Carbonate surfaces (204) inside the reservoirs described herein are typically oil-wet, and as a result, oil (206) adheres strongly to the surfaces within the formation, making extraction of that oil difficult. When injected into a reservoir, the low salinity water (202) alters the wettability of carbonate surfaces within the subterranean formation. The surface wettability changes from oil-wet to water-wet, allowing the oil to detach from the carbonate surface. The result of this change in wettability is shown in FIG. 2B. The oil (206)

detaches from the carbonate surface (204) and is then suspended in the low-salinity water (202).

The low salinity water (202) may contain any appropriate amount of total dissolved solids. In one or more embodiments, the low-salinity water (202) contains 4,000-8,000 ppm total dissolved solids. For example, the low salinity water (202) may have a lower limit of any of 4,000, 4,500, or 5,000 total dissolved salts, and an upper limit of any of 6,000, 7,000, or 8,000 total dissolved salts, where any lower limit may be used in combination with any mathematically compatible upper limit.

The low salinity water (202) may also include certain ions that are beneficial for changing the wettability of surfaces within the reservoir. For example, the low salinity water (202) may be contain one or more salts that include but are not limited to sodium chloride (NaCl), calcium chloride ($CaCl_2$), magnesium chloride ($MgCl_2$), sodium sulfate ($Na_2SO_4$) calcium sulfate ($CaSO_4$) and magnesium sulfate ($MgSO_4$). Thus, embodiments of the disclosure may include aqueous solutions having a concentration of one or more ions that include but are not limited to sodium ions, sulfate ions, calcium ions, magnesium ions, and chloride ions.

In one or more embodiments, the low-salinity water (202) includes 300-3,000 ppm of sulfate ions. For example, the low salinity water (202) may have a lower limit of any of 300, 500 or 700 ppm of sulfate ions, and an upper limit of any of 1,000, 2,000, or 3,000 ppm of sulfate ions, where any lower limit may be used in combination with any mathematically compatible upper limit. Without being bound by any particular mechanism or theory, it is believed negatively charged sulfate ions preferentially adsorb onto positively charged carbonate surfaces, altering the positively charged surface to a more negative charge. Negatively charged crude oil functionality, such as carboxylic acids, may be adsorbed to the carbonate surface. As a result of this wettability change due to the presence of sulfate ions on the carbonate surface, crude oil may be released from the carbonate surface, allowing for the oil to be recovered.

In one or more embodiments, the low-salinity water (202) includes 200-1,000 ppm of magnesium and calcium ions. For example, the low salinity water (202) may have a lower limit of any of 200, 300 or 400 ppm of magnesium and calcium ions, and an upper limit of any of 500, 750 or 1,000 ppm of magnesium and calcium ions, where any lower limit may be used in combination with any mathematically compatible upper limit. Without being bound by any particular mechanism or theory, it is believed positively charged calcium ions will also attract the negatively charged crude oil functionality, such as carboxylic acids, which may help attract the crude oil away from the carbonate surface, allowing for the oil to be recovered.

The low-salinity water (202) may also contain additives. The additives may be selected from the group consisting of polymers, surfactants, carbonated water, nanoparticles, and combinations thereof. In one or more embodiments, the low-salinity water includes from 100 to 1,000 ppm of additives. Some additives, such as surfactants and nanoparticles, may enhance the wettability changes achieves by the previously-described ions present in low-salinity water. Such additives may also reduce oil-water interfacial tension by one to two orders of magnitude. Additives such as polymers, may be employed to increase the viscosity of the low-salinity water, improving mobility control.

In one or more embodiments, the amount of low-salinity water (202) injected into the reservoir during each injection is from 0.05 to 0.25 pore volumes. For example, the amount injected into the reservoir during each injection may have a lower limit of any of 0.05, 0.08, 0.10, 0.12, or 0.16 pore volumes, and an upper limit of any of 0.18, 0.20, 0.22, or 0.25 pore volumes, where any lower limit may be used in combination with any mathematically compatible upper limit.

The total amount of low-salinity water injected into the reservoir is from 0.25 to 1.0 pore volumes. For example, the total amount of low-salinity water may have a lower limit of any of 0.25, 0.28, or 0.50 pore volumes, and an upper limit of any of 0.6, 0.8, or 1.0 pore volumes, where any lower limit may be used in combination with any mathematically compatible upper limit. It is envisioned that the particular pore volume of low salinity water that is injected may depend, for example, based on the permeability and reservoir heterogeneity, with greater volumes used in high permeability and/or heterogeneous reservoirs.

As explained above, a result of the injection of low salinity water is that the oil (204) is released from the carbonate surface due to the change in wettability. Such tailored water chemistry may favorably alter surface charges at carbonate/brine and crude oil/brine interfaces to result in wettability modifications towards water-wet conditions. The resulting water-wet conditions would reduce the adhesion of crude oil to the carbonate surfaces thereby releasing the oil attached to carbonate surface. However, much of the oil released from the surface is then present as droplets in the low-salinity water. This can be problematic for efficient oil recovery because the oil phase has poor mobilization within the water phase, and therefore the oil cannot be readily recovered. In order to improve coalescence of the oil phase, seismic stimulation (104) is applied to the reservoir to coalesce and improve the connectivity of oil phase for improved mobilization.

Figure 3:
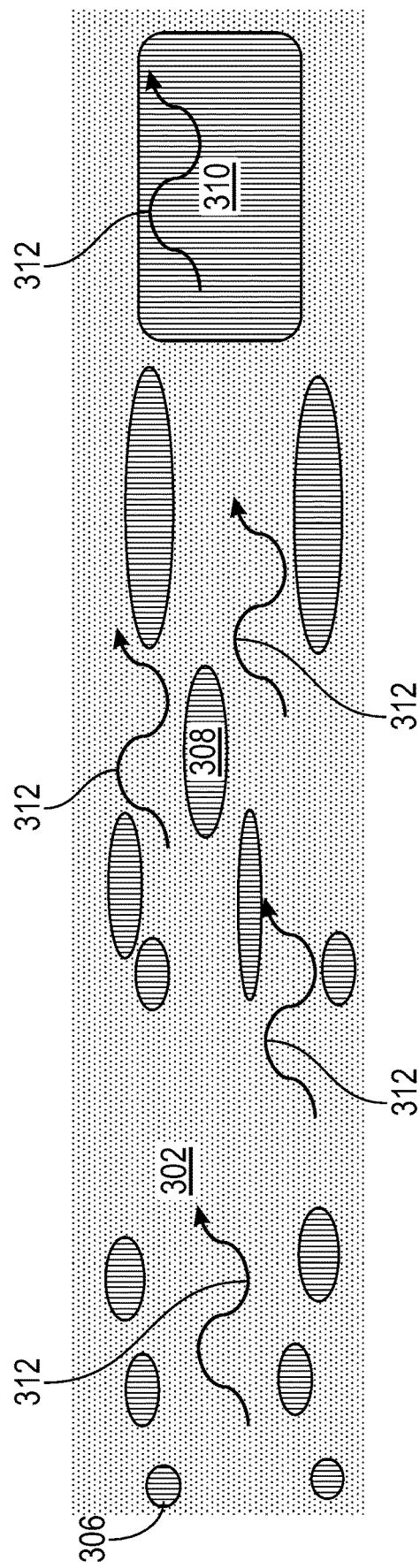
FIG. 3 is a schematic depiction of oil in a reservoir in accordance with one or more embodiments of the present disclosure.

Turning now to FIG. 3, a schematic depiction of the effects of seismic stimulation in accordance with one or more embodiments of the present disclosure is shown. The seismic stimulation (described in FIG. 1 as 102) (to be described in further detail below) produces elastic waves (312) that propagate through the reservoir. The elastic waves promote the coalescence of small oil droplets (306) into larger oil ganglia/clusters (308). An oil ganglion/cluster (308) may be from 10 to 100 times the size of an oil droplet (306). For example, if an oil droplet has a diameter of from 20-100 μm, a ganglion/cluster may have a diameter of 2,000 to 10,000 μm due to the seismic stimulation being applied. As the seismic stimulation (102) is continuously applied over time, the oil ganglia (308) are mobilized into an oil phase (310). This oil phase (310) may then be more readily recovered from a production well.

Figure 4:
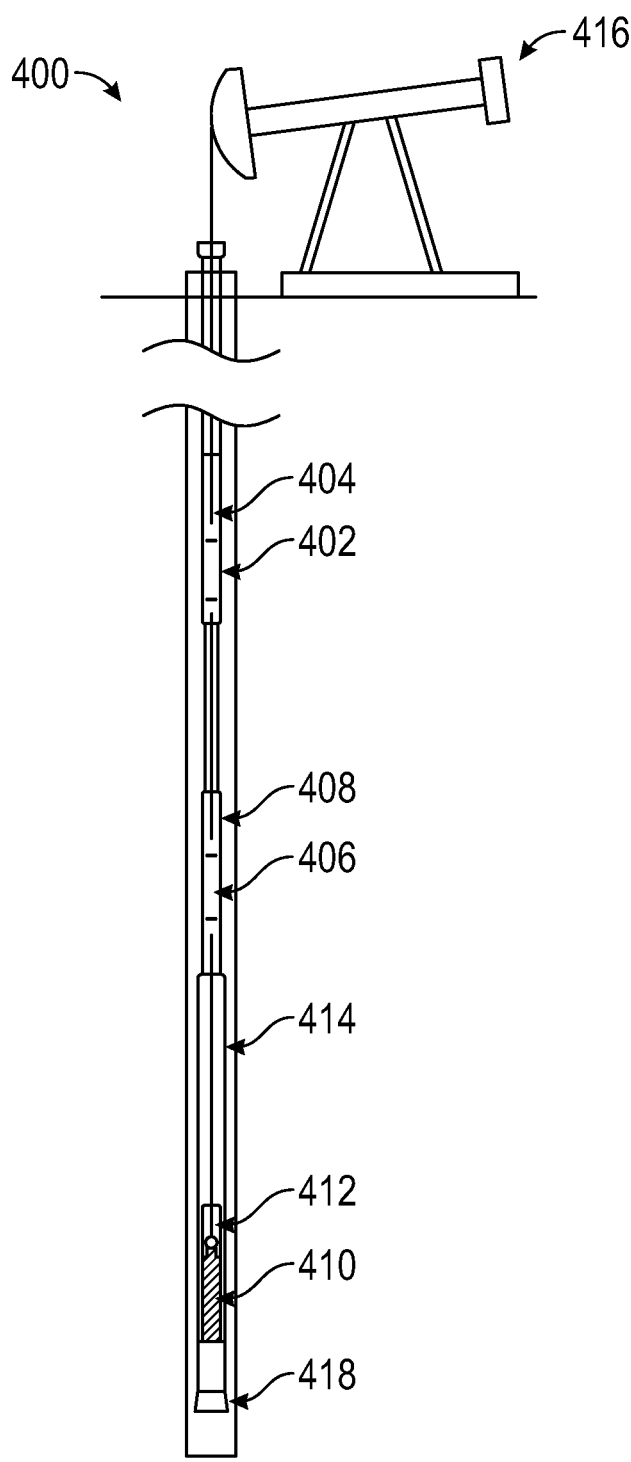
FIG. 4 is a schematic depiction of a seismic stimulation tool in accordance with one or more embodiments of the present disclosure.

Seismic stimulation (102) is applied by releasing a small amount of pressurized fluid into the reservoir. An exemplary embodiment of an apparatus used for seismic stimulation is shown in FIG. 4. The seismic stimulation apparatus (400) has three plungers each having a corresponding barrel. The apparatus (400) has a damper plunger (402), a damper barrel (404), an upper plunger (406), an upper barrel (408), a lower plunger (410) and a lower barrel (412). Specialized tubing (414) is located between the upper (406) and lower (410) plungers, and serves as a compression chamber. The lower plunger (410) contains a valve to bring in fluids (not shown). The tool draws in fluid from the reservoir to be compressed. Thus, the fluid used by the seismic stimulation apparatus may be the previously-described low-salinity water. As the pumping unit (416) reaches the bottom of a stroke, fluid is drawn in through the valve, and into the specialized tubing (414), where it is compressed between the upper (406) and lower (410) plungers. The fluid may be compressed to a pressure of from 2,500 to 5,000 psi. The compressed fluid is released at the top of a stroke of the pumping unit (416). Several gallons of fluid are released during each stroke. The released fluid causes shock waves that are amplified by an amplifier (418) located below the lower plunger (410). The damper plunger (402) and barrel (404) decelerate the upward velocity the apparatus experiences upon release of fluid. As illustrating, the seismic stimulation apparatus (400) is permanently installed in the injection well; however, it is also envisioned that non-fixed tools may instead be used, which may be run into the well on a wireline, for example. This fluid release occurs at a consistent interval of from about 30 seconds to 1 minute in between each fluid release. The release of fluid creates high energy elastic waves having 1-10 megawatts of power and a frequency of from 20 Hz to 100 Hz.

The seismic stimulation may occur for a duration of 1-4 weeks, for example. In this time period, the oil coalesces to a sufficient extent for recovery of the oil phase. The specific amount of time for the seismic stimulation will be described in greater detail below.

As shown above, the steps of injecting an amount of low-salinity water as small slugs into the reservoir and applying seismic stimulation are repeated until an amount of low-salinity injected into the reservoir reaches a total amount of from 0.25 to 1.0 pore volumes. Repeatedly injecting small slugs of 0.05 to 0.25 pore volumes of low-salinity water releases additional oil droplets from the carbonate surface. After each injection of low-salinity water and subsequent release of oil droplets, the seismic stimulation coalesces the oil droplets that were released to form the coherent oil phase.

The final step of injecting high-salinity water in an amount of 0.5 to 1.0 pore volumes serves to move the oil phase towards a production well. The high-salinity water may contain 35,000 to 57,000 ppm of total dissolved solids. For example, the high-salinity water may have a lower limit of any of 35,000, 37,000, or 40,000 total dissolved salts, and an upper limit of any of 50,000, 52,000, 55,000, or 57,000 total dissolved salts, where any lower limit may be used in combination with any mathematically compatible upper limit. For example, it is understood that the high-salinity water may be seawater, brackish water, produced water, or other aqueous solutions having one or more salts present therein. Salts that may be present include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these.

Figure 5:
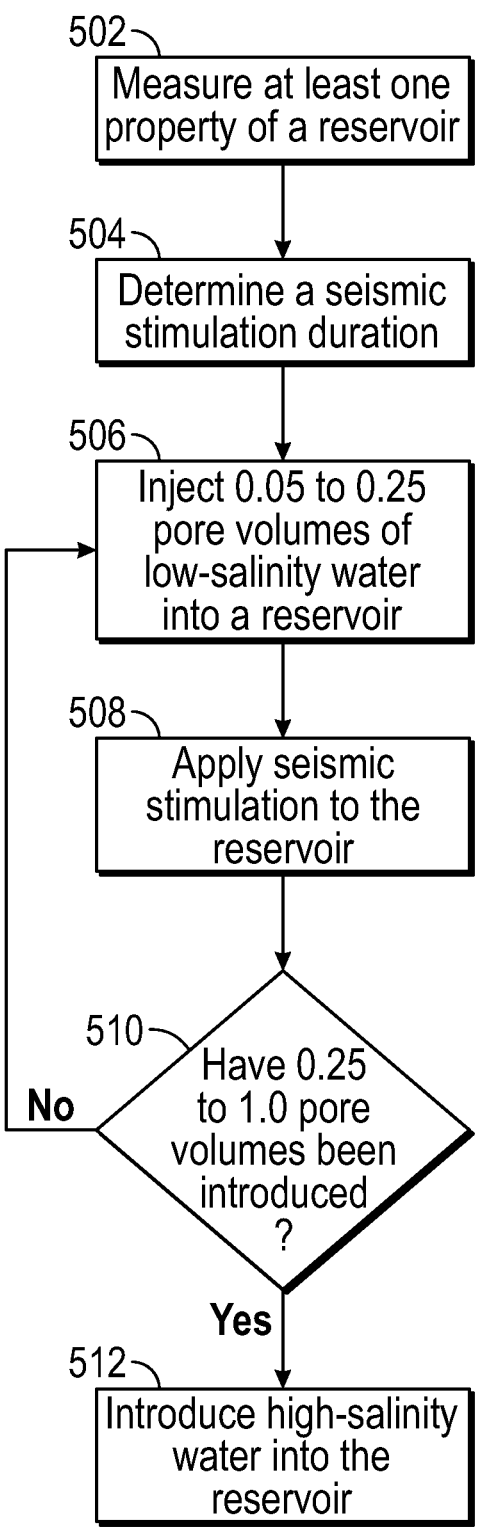
FIG. 5 is a block flow diagram of a method in accordance with one or more embodiments of the present disclosure.

Turning now to FIG. 5, a method in accordance with one or more embodiments of the present disclosure is shown. In the embodiment shown in FIG. 5, at least one property of a reservoir is measured (502). Then, based upon the measured property or properties, a seismic stimulation duration is determined (504). 0.05 to 0.25 pore volumes of low-salinity water is injected into reservoir (506). Then, seismic stimulation is applied to the reservoir (508) for the determined duration of time. After seismic stimulation has been applied for the determined duration of time, low-salinity water is again injected into the reservoir and seismic stimulation is again applied to the reservoir. These steps are repeated sequentially until an amount of 0.25 to 1.0 pore volumes of low-salinity water has been added to the reservoir (510). High salinity water is then introduced into the reservoir (512). Finally, displaced oil may be recovered from the carbonate reservoir and produced through a production well.

The combined effect of the low salinity water injection coupled with seismic stimulation is that a larger volume of oil is released from rock surfaces (due to low salinity water effect illustrated in FIG. 2) and then forms a larger oil bank due to the increased oil phase connectivity (from the seismic stimulation effect illustrated in FIG. 3). As a result of these two effects, larger volumes of oil will be easily mobilized and pushed towards the producing wells. Thus, advantageously, methods of the present disclosure may provide for higher oil recovery, increased oil production, lower water cut in the production and faster oil recovery.

Embodiments of the present disclosure also relate to designing a stimulation method for a given reservoir. As mentioned above, a seismic stimulation duration of 1-4 weeks is described. The particular duration may be based on viscosity of the oil, formation permeability, and spacing between injection and production wells, all of which may impact how the amount of time needed for the oil to coalesce and begin to mobilize. For example, lower viscosity oils, higher formation permeability and shorter spacing between injection and production wells may utilize shorter time periods for seismic stimulation. In contrast, high viscosity oils, low permeability formations, and longer spacing between injection and production wells may utilize greater time durations for seismic stimulation.

The oil viscosity, the average permeability of targeted reservoir zone, and the well spacing (i.e., the distance between injection to production wells) may be used to determine the duration of seismic stimulation. For example, if the oil viscosity is less than 2.5 cP (centipoise) the seismic stimulation may be performed for about one week. If the oil viscosity is from 2.5 to 5 cP, seismic stimulation may be performed for about 2 weeks. If the oil viscosity if from 5 cP to 7.5 cP, seismic stimulation may be performed for about 3 weeks. If the oil viscosity is from 7.5 cP to 10 cP, seismic stimulation may performed for about 4 weeks. If the average permeability is less than 250 and (millidarcy), seismic stimulation may be performed for about 4 weeks. If the average permeability is from 250 to 500 md, seismic stimulation may be performed for about 3 weeks. If the average permeability is from 500 to 750 md, seismic stimulation may be performed for about 2 weeks. If the average permeability is from 750 to 1000 md, seismic stimulation may be performed for about 1 week. If the well spacing is less than 250 m (meters), seismic stimulation may be performed for about 1 week. If the well spacing is from 250 to 500 m, seismic stimulation may be performed for about 2 weeks. If the well spacing is from 500 m to 750 m, seismic stimulation may be performed for about 3 weeks. If the well spacing is from 750 m to 1000 m, seismic stimulation may be performed for about 4 weeks. If measured properties of a reservoir correspond to different seismic stimulation durations, the longest duration may be selected.

Embodiments of the present disclosure may be useful for applications in a variety of oil recovery operations, including in a variety of rock formation types. It may be understood that when formation types other than carbonates are encountered, that the salinity of the fluids may be altered based on ion exchange sites present at rock surface so that a change in wettability may be achieved. Further, the methods described herein are suitable for either vertical or horizontal wells. The methods described herein may be suitable for use at single injection wells or multiple injection wells. If multiple injection wells are used, the methods described herein may be performed at each individual well according to the methods described above. The methods may also be used in abandoned wells that are in close proximity to active wells.

Embodiments of the present disclosure may provide at least one of the following advantages. The methods disclosed herein may result in in higher oil recovery, increased oil production, lower water cut in production and faster oil recovery as compared to traditional methods.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. An oil recovery method comprising:
   (a) injecting 0.05 to 0.25 pore volumes of low-salinity water comprising 4,000-8,000 ppm of total dissolved solids into a reservoir;
   (b) applying seismic stimulation to the reservoir for a predetermined duration;
   (c) repeating steps (a)-(b) until 0.25 to 1.0 pore volumes of the low-salinity water has been added to the reservoir; and
   (d) introducing an amount of high-salinity water comprising 35,000 to 57,000 ppm of total dissolved solids to the reservoir.

2. The method of claim 1, wherein the low-salinity water comprises 300-3000 ppm of sulfate ions, and 200-500 ppm of magnesium and calcium ions.

3. The method of claim 1, wherein the low-salinity water comprises an additive selected from the group consisting of polymers, surfactants, carbonated water, nanoparticles, and combinations thereof.

4. The method of claim 1, wherein the applying comprises repeatedly releasing an amount of pressurized fluid into the reservoir at a time interval of from 30 seconds to one minute.

5. The method of claim 4, wherein the pressurized fluid is compressed at a pressure of from 2,500 to 5,000 psi.

6. The method of claim 4, wherein the amount of pressurized fluid is from 5 to 10 gallons.

7. The method of claim 1, wherein the predetermined duration is from 1 to 4 weeks.

8. The method of claim 1, wherein the seismic stimulation comprises a frequency of from 20 Hz to 100 Hz.

9. The method of claim 1, wherein the amount of high salinity water is from 0.5 to 1.0 pore volumes.

10. The method of claim 1, wherein the reservoir comprises an injection well extending therethrough in which the injecting and applying occur, wherein the injection well is horizontal or vertical.

11. The method of claim 10, wherein the reservoir comprises at least two injection wells in which the injecting and applying occur.

12. The method of claim 1, wherein the reservoir comprises an abandoned well in which the injecting and applying occur.

* * * * *